July 26, 1966   L. A. JOHNSON ETAL   3,262,661
DAMPING SYSTEM FOR WASHING MACHINES
Filed April 30, 1964   3 Sheets-Sheet 1

INVENTORS: LESLIE A. JOHNSON
W. A. WASEMANN
BY Ralph T. French
ATTORNEY

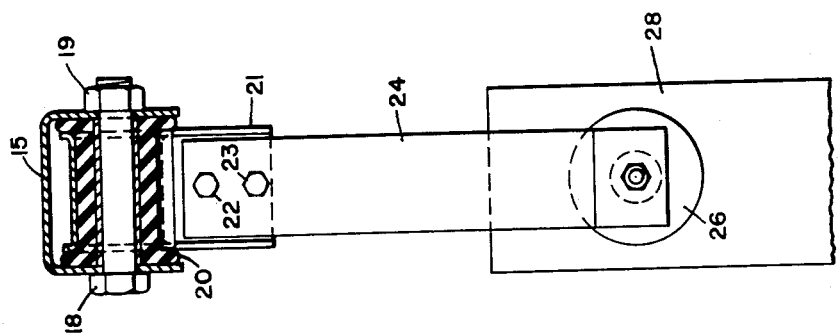
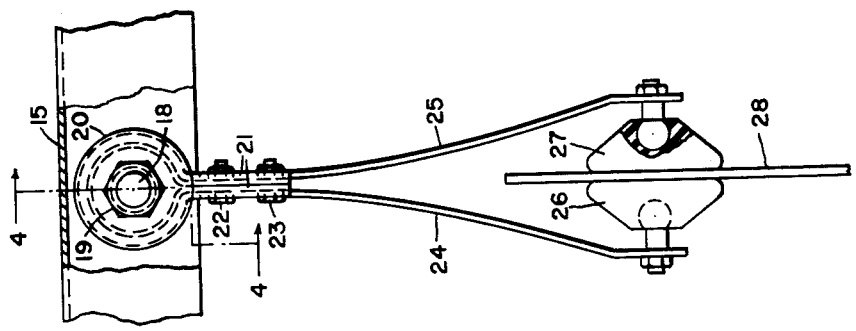

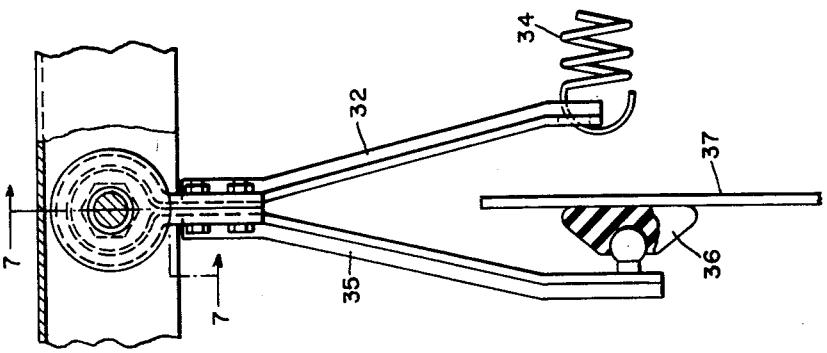
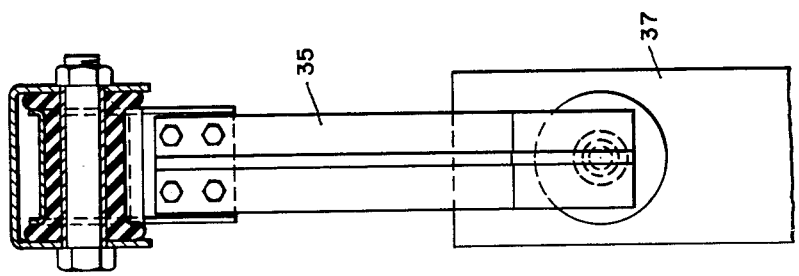
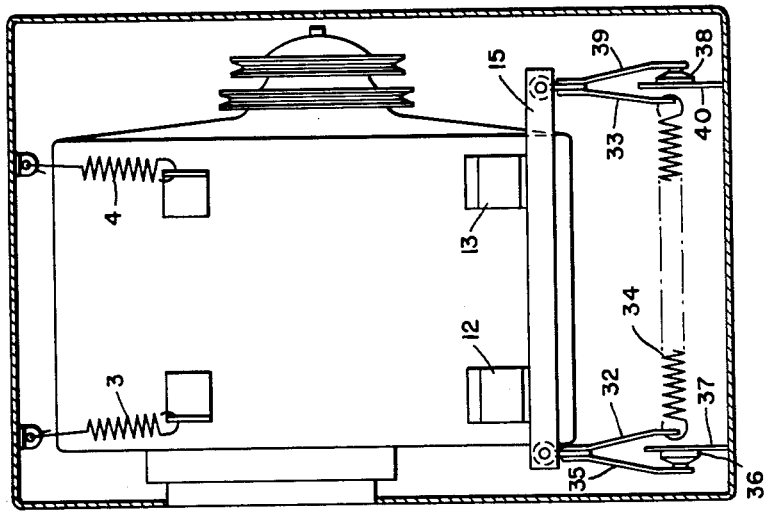

United States Patent Office 3,262,661
Patented July 26, 1966

3,262,661
DAMPING SYSTEM FOR WASHING MACHINES
Leslie A. Johnson and William A. Wasemann, both of Mansfield, Ohio, assignors to Westinghouse Electric Corporation, Pittsburgh, Pa., a corporation of Pennsylvania
Filed Apr. 30, 1964, Ser. No. 363,828
7 Claims. (Cl. 248—18)

This invention relates to the mounting of the tumblers of washing and drying machines within their housings and particularly to the means employed to dampen vibrations set up therein during the operation of these devices due to imbalance in the load.

It is conventional to provide spring suspension for these devices and some damping means, particularly to brake up and down motion and side to side motion, and such means is often considered adequate. However, this conventional damping means fails to brake oscillation about the vertical axis or oscillation about the sidewise horizontal axis, sometimes known as yaw, and while these movements are not as great as those for which the braking means is conventionally provided they become important where the housing for the device is limited in its dimensions.

An object of this invention is to provide means going beyond conventional means which will operate to dampen oscillations about the vertical axis and about a horizontal axis of the machine.

In accordance with the present invention the tumbler of the machine is mounted within a shell which in turn is suspended within the housing of the device by a number of springs so that vibrations set up in said shell will not be communicated to the housing. Damping means in the form of brake shoe lining tightly pressed against the surface of fins rigidly attached to the housing provide a degree of freedom for up and down and side to side movement but dissipate and slow down this movement. This damping means is carried by spring means used to press a pair of brake shoes embracing the fin attached to the housing, the said spring means being anchored to the shell which encloses the tumbler. The characteristic aspect of the present invention lies in the means and the manner by which the connection between the brake shoe springs are secured to the said shell. Such means consist generally of the interposition of rubber bushings between such spring means and the said shell whereby a slight yaw motion may be accommodated and damped.

In accordance with this invention a pivot in the shape of a bolt is rigidly fixed to the shell of the device and this is covered by a rubber bushing which is then squeezed by bracket means to which the brake shoe springs are affixed. This spring means thus becomes a link between the fin rigidly attached to the housing of the machine and an anchorage rigidly attached to the shell of the device and which affords a degree of movement at either end thereof.

A feature of the invention may therefore be stated as the use of a plurality of links between the housing of the device and the shell within which the tumbler is mounted for allowing a degree of freedom of movement of the said shell while damping such movements by friction and by compression of resilient material.

Another feature of the invention is the manner in which the said links are secured to the shell of the device. Here means are provided to secure to this shell a number of pivot pins, one for each link. Each pivot pin is covered by a rubber gasket and then a bracket, secured to the link is closed about this gasket so that the rubber is compressed to the point where any relative movement of the link with respect to the shell is only through a distortion of the rubber. This allows a small movement known as a yaw movement but acts mainly to dampen it.

Another feature of the invention is the use of a plurality of restraining links each having means at one end thereof to restrain and damp certain of the modes of vibration of the shell and means at the other end thereof to restrain and damp other modes of vibration. Thus each link has brake shoe means at one end to straddle a cooperatively secured fin to damp up and down and side to side vibrations and a compressed rubber gasket over a pivot pin at the other end of the link to damp oscillation about a vertical axis and about a right-left horizontal axis which produce yaw motion.

The means by which the brake shoes may be forced together and made to exert pressure on the fin which they straddle may be in the form of leaf springs forming the main body of the link or they may reside in an alternative arrangement whereby the links are used in pairs and a tension spring is connected between each said pair. In this latter case but a single brake shoe is required for each link.

In the case of yaw motions the damper assembly must rotate or flex at its mounting point. The rubber bushings provide a silent bearing for such motions and also provide additional damping for these motions.

A highly desirable characteristic of any washing damping system where the present invention may be employed is a reduction of the damping at spin speed. From an ideal standpoint damping is desired only through the critical range. The rubber bushings permit a certain amount of pretravel on sideways damping, loss motion which allows the suspended unit to move slightly without actually moving the friction shoes on the fins. Since the motions through the critical range are larger than those at spin speed, this loss motion results in a significant reduction of damping at spin speed but percentagewise a lesser reduction in the critical range. The net result is adequate damping at critical speed and reduced damping at spin speed, with a corresponding reduction of power loss in spin and less housing vibration.

The drawings consist of three sheets having seven figures, as follows:

FIG. 3 is a side view, substantially in vertical section of one of the damping links and a fin cooperatively associated therewith for holding the shell firmly in place and damping the movements thereof during operation;

FIG. 4 is substantially a vertical section taken on the line 4—4 and a side view of the link and the fin cooperatively associated therewith;

FIG. 5 is a side view, similar to FIG. 1, showing an alternative construction of a pair of restraining links;

FIG. 6 is a vertical section, similar to FIG. 3 of a link forming one of a pair such as shown in FIG. 5; and FIG. 7 is a side view vertical section, similar to FIG. 4, of one of the restraining links and its cooperatively associated fin.

Figure 2:
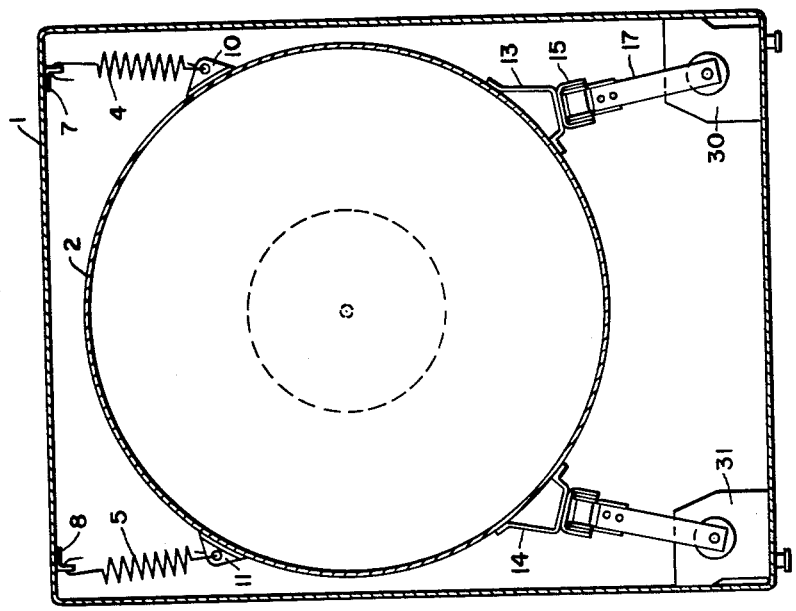
FIG. 2 is a front view, substantially in vertical section of the suspension of the shell within the housing.
Figure 1:
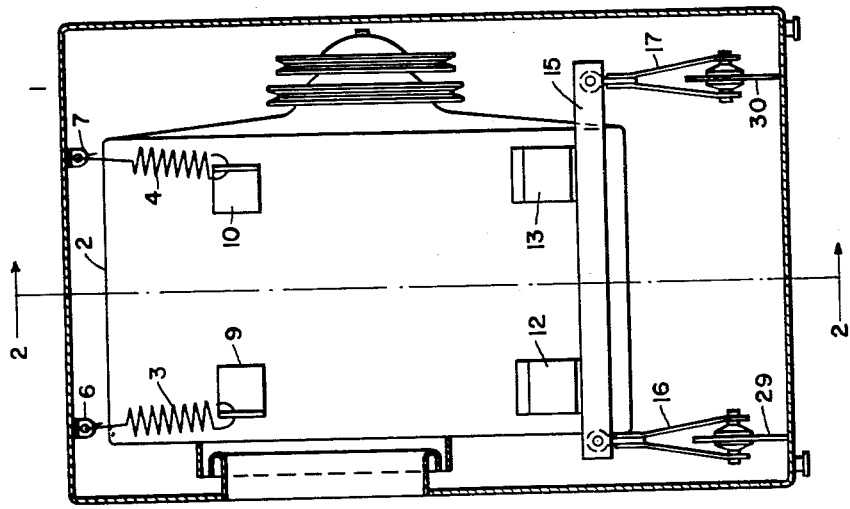
FIG. 1 is a side view schematic partly in vertical section showing the suspension of a shell enclosing a tumbler within the housing or cabinet.

In FIGS. 1 and 2 the cabinet or housing 1 of the tumbler washing machine holds the shell 2 suspended by a set of springs, such as 3, 4 and 5, secured to the housing by brackets 6, 7 and 8 respectively, and similarly secured to the shell by brackets 9, 10 and 11. The manner in which these brackets are secured to the housing and to the shell is conventional.

There are then four links for restraining vibrations of the shell 2 due to fortuitous imbalance of the load within the tumbler mounted conventionally within the shell. These links shown in detail in FIGS. 3 and 4 are secured to the shell by brackets 12, 13 and 14. Brackets 12 and 13 provide a base to which a channel bar 15 is secured. At each end of the chanel bar 15, a link such as 16 and 17, is pivoted. As shown more in detail in FIGS. 3 and 4, each link is secured to the channel bar 15 by a pivot pin consisting of the bolt 18 and its nut 19. The bolt is threaded through a rubber gasket 20 which is then enclosed by bracket 21 and compressed about the body of the bolt 18 when the bolts 22 and 23 are tightened. The rubber gasket 20 is so tightly compressed that the link may not actually revolve about the pivot pin but is allowed a slight rotary movement about its pivot pin by further distortion of the gasket. The link, as shown in FIG. 4, may also move slightly in a rotary right or left movement about the longitudinal axis of the chanel bar 15 whereby this slight further compression of the rubber gasket 20 acts to damp the vibrations of the shell 2.

The bracket 21, wrapped about the gasket 20 and tightened by the bolts 22 and 23 forms the basis for mounting a pair of leaf springs 24 and 25 comprising the links 16 and 17 at whose other ends a pair of brake shoes 26 and 27 constructed of frictional material are mounted to bear firmly on the surfaces of a fin 28 rigidly secured to the housing 1. In FIGS. 1 and 2 the fins 29, 30 and 31 are shown so that it will be readily apparent that any up and down movement of the shell 2 or any right and left movement thereof, as shown in FIG. 2, will be restrained by friction between the brake shoes and the cooperatively associated fins. In the case of a twisting motion known as yaw, the compressed rubber gaskets will allow a small degree of such motion, but such further compression will restrain and tend to dissipate this movement.

FIGS. 5, 6 and 7 show an alternative but equally effective arrangement in which a pair of brake shoes is shared by two links, the other arms of the two links 32 and 33 being then drawn together by the tension spring 34. The arms of the link in this case are fabricated from metal having a ridge down their centerlines for strength as a restraint against bending as a leaf spring, although it will be apparent that the ridges may be replaced by flanges along the edges of the arms. Here, as shown in FIG. 5, the brake shoe 36 carried by the arm 35 rubs against the left-hand face of the fin 37 while the brake shoe 38, carried by the arm 39, rubs against the right-hand face of the fin 40. These brake shoes made of friction material damp the movements of the links between the body of the shell and the cabinet which is used to house the washer.

What is claimed is:

1. In a device wherein a shell containing moving means is mounted within a housing and wherein said moving means is subject to various modes of vibration due to fortuitous imbalance thereof, means for mounting said shell within said housing comprising a plurality of springs for suspending said shell and a plurality of links connected between said shell and said housing, a fin for each said link fixed to said housing, a pair of friction shoes on each said link astraddle each said fin, each said link including spring means associated therewith for holding said friction shoes firmly against said fin, a pivot pin for each said link channel bar means attached to said shell for mounting said pivot pins, a resilient material gasket about each said pivot pin and a bracket encompassing each said gasket and attached to the end of each said link to connect said link to said bar.

2. In a device wherein a shell containing moving means is mounted within a housing and wherein said moving means is subject to various modes of vibration due to fortuitous imbalance thereof, means for mounting said shell within said housing comprising a plurality of springs for suspending said shell and a plurality of restraining links between said housing and said shell, a fin for each link firmly attached to said housing, a channel bar for each pair of said links firmly attached to said shell, a pivot pin at each end of said channel bar for pivotally attaching a pair of said links thereto, a rubber lined bracket carried by the end of each link for cooperative association with said pivot pins, a tension spring between each said pair of links for straining said links together and a friction shoe for each said link mounted on the end thereof and bearing against the face of one of said fins.

3. In a washing machine having an outer housing and a suspended shell enclosing a tumbler subject to various modes of motion due to fortuitous imbalance of the tumbler during rotation, a damping system comprising:
   link means connecting each lower quadrant of said shell, adjacent both the front and the back sides of said shell, to said housing;
   each of said link means including leaf spring means carrying a friction shoe at one end, and having a looped opposite end;
   a fin attached to said housing against which said shoe is firmly pressed;
   a pivot pin attached to said shell, and a pin-encasing resilient gasket held in compressed condition by said looped, opposite ends;
   said link means being disposed relative to said tumbler so that the axes of said friction shoes extend generally parallel to the axis of said tumbler, and the axes of said pivot pins extend generally perpendicular to the axes of said friction shoes.

4. In a washing machine of the character described including a tumbler rotatable about a horizontal axis and disposed within a non-rotating shell, an arrangement for mounting said shell within an outer housing, comprising:
   a plurality of springs for suspending said shell within said housing;
   a plurality of links between said shell and said housing;
   means for connecting one end of said links to said shell and the other end of said links to said housing;
   said connecting means at the shell end including a pivot pin connected to said shell and extending generally transversely relative to said tumbler axis;
   said means at the housing end of said link including a fin fixed to said housing and having a generally upright planar surface parallel to the axis of said pin;
   a resilient material bushing on each said pivot pin;
   a bracket rigidly connected to said shell end of each said link, said bracket embracing said bushing tightly to provide a firm connection which is yieldable to a highly limited degree through deformation of said bushing;
   friction shoe means attached to said housing end of each said link and disposed in facing relation to said planar surface of said fin for bearing against said fin; and
   spring means urging said friction shoe means tightly against said planar surface along a line of force generally parallel to the axis of said tumbler and transverse to the axis of said pin.

5. In a washing machine according to claim 4:
   each said link includes said spring means in the form of a pair of leaf spring arms biased toward each other at said housing end of said link and carrying facing friction shoes bearing tightly against opposite faces of said fin.

6. In a washing machine having an outer housing and a suspended, shell-enclosed tumbler subject to various modes of motion due to fortuitous imbalance of the tumbler during rotation, a damping system comprising:
   a plurality of linking arms between said shell and said housing, said arms having a damping connection at each end;
   the damping connection at one of said ends including a brake surface and a brake shoe pressed firmly against said surface along a line of force generally parallel to said tumbler axis;

the damping connection at said other end including a pivot pin having its axis generally transverse to said line of force of said shoe upon said brake surface, a resilient material bushing around said pin, and a loop bracket embracing said bushing tightly to provide a firm connection which is yieldable to a highly limited degree through deformation of said bushing.

7. In a tumbler-type clothes washing device wherein a shell containing a tumbler rotatable on a horizontal axis is mounted within a housing and wherein said tumbler is subject to various modes of vibration due to fortuitous imbalance thereof, means for mounting said shell within said housing comprising a plurality of springs for suspending said shell and a pair of links connecting the lower side of said shell to said housing, a fin for each said link rigidly attached to said housing, each said link comprising spring means and a pair of friction shoes pressed together by said spring means and embracing said fin for dissipating movement of said shoes over the faces of said fin, bar means rigidly attached to said lower side of said shell and extending from front-to-rear generally parallel to said horizontal axis, a pivot pin for each said link rigidly attached to said bar means adjacent each end thereof, a bracket on each said link at the opposite end of said link from said friction shoes for cooperative association with one of said pivot pins and a compressed layer of resilient compressible material tightly gripped between said bracket and said pivot pin.

References Cited by the Examiner
UNITED STATES PATENTS

| 2,308,458 | 1/1943 | Saurer | 248—7 |
| 2,647,591 | 8/1953 | Young | 188—1 |
| 2,793,757 | 5/1957 | McWethy | 188—1 X |
| 3,030,101 | 4/1962 | McIntosh | 267—54 |
| 3,114,705 | 12/1963 | Pribonic et al. | 248—18 X |

CLAUDE A. LE ROY, *Primary Examiner.*

CHANCELLOR E. HARRIS, *Examiner.*

J. PETO, *Assistant Examiner.*